US010860237B2

United States Patent
Susairj et al.

(10) Patent No.: US 10,860,237 B2
(45) Date of Patent: Dec. 8, 2020

(54) STORAGE INTEGRATED SNAPSHOT CLONING FOR DATABASE

(71) Applicant: Oracle International Corporation, Redwood Shores, CA (US)

(72) Inventors: Margaret Susairj, Sugar Land, TX (US); Sumanta Chatterjee, Fremont, CA (US); Kumar Rajamani, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 809 days.

(21) Appl. No.: 14/313,926

(22) Filed: Jun. 24, 2014

(65) Prior Publication Data

US 2015/0370641 A1    Dec. 24, 2015

(51) Int. Cl.
*G06F 3/06* (2006.01)
*G06F 16/11* (2019.01)
*G06F 16/27* (2019.01)

(52) U.S. Cl.
CPC ............ *G06F 3/065* (2013.01); *G06F 3/0619* (2013.01); *G06F 16/27* (2019.01); *G06F 16/128* (2019.01)

(58) Field of Classification Search
CPC .......... G06F 17/30; G06F 3/06; G06F 3/0619; G06F 3/065; G06F 17/30575; G06F 16/11; G06F 16/27
USPC ......................................................... 707/645
See application file for complete search history.

(56) References Cited

U.S. PATENT DOCUMENTS

| 5,564,037 | A | 10/1996 | Lam |
| 5,953,729 | A | 9/1999 | Cabrera |
| 7,010,663 | B2 | 5/2006 | George et al. |
| 7,213,012 | B2 | 5/2007 | Jakobsson |
| 7,475,098 | B2 * | 1/2009 | Patterson ............ G06F 11/1458 |
| 7,644,730 | B2 | 1/2010 | Reck |
| 8,468,174 | B1 * | 6/2013 | Yueh ................... G06F 11/1448 |
|  |  |  | 707/796 |
| 9,239,869 | B1 | 1/2016 | Zhang |
| 9,575,849 | B2 * | 2/2017 | Mittal ................... G06F 16/273 |

(Continued)

OTHER PUBLICATIONS

Lee U.S. Appl. No. 14/692,602, filed Apr. 21, 2015, Notice of Allowance, dated Jun. 30, 2017.

(Continued)

*Primary Examiner* — Hosain T Alam
*Assistant Examiner* — Saba Ahmed
(74) *Attorney, Agent, or Firm* — Hickman Palermo Becker Bingham LLP

(57) ABSTRACT

Techniques are described herein for cloning a database. According to some embodiments, a database server receives a request to clone a source database. In response to receiving the request, the database server retrieves a set of one or more storage credentials for a set of one or more respective storage systems on which a set of files of the source database are stored. The set of storage credentials grant permission to the database server to create snapshot copies on the set of storage systems. The database server generates, for a target database using the set of storage credentials, a snapshot copy of each respective file in the set of files of the source database. The snapshot copy of the respective file points to the same set of one or more data blocks as the respective file until at least one of the data blocks is modified.

18 Claims, 8 Drawing Sheets

(56) References Cited

U.S. PATENT DOCUMENTS

| | | | |
|---|---|---|---|
| 10,067,952 B2* | 9/2018 | Ahrens | G06F 11/1456 |
| 2003/0074492 A1 | 4/2003 | Cochran | |
| 2003/0093408 A1 | 5/2003 | Brown et al. | |
| 2003/0158863 A1 | 8/2003 | Haskin | |
| 2003/0167255 A1 | 9/2003 | GraBhoff et al. | |
| 2004/0268068 A1 | 12/2004 | Curran | |
| 2005/0246397 A1* | 11/2005 | Edwards | G06F 17/30067 |
| 2006/0179261 A1* | 8/2006 | Rajan | G06F 17/30067 |
| | | | 711/162 |
| 2006/0230035 A1 | 10/2006 | Bailey et al. | |
| 2008/0052266 A1 | 2/2008 | Goldstein et al. | |
| 2008/0072003 A1 | 3/2008 | Vu | |
| 2008/0162491 A1* | 7/2008 | Becker | G06F 17/30581 |
| 2008/0162842 A1 | 7/2008 | Boutcher | |
| 2008/0244028 A1* | 10/2008 | Le | G06F 3/0607 |
| | | | 709/208 |
| 2008/0256311 A1* | 10/2008 | Lee | G06F 3/0605 |
| | | | 711/162 |
| 2010/0250499 A1* | 9/2010 | McAlister | G06F 11/1471 |
| | | | 707/679 |
| 2011/0022581 A1 | 1/2011 | Korlapati | |
| 2011/0191296 A1* | 8/2011 | Wall | G06F 16/00 |
| | | | 707/639 |
| 2011/0307447 A1 | 12/2011 | Sabaa | |
| 2012/0017060 A1 | 1/2012 | Kapanipathi | |
| 2012/0221534 A1 | 8/2012 | Gao et al. | |
| 2013/0054531 A1* | 2/2013 | Susairaj | G06F 16/217 |
| | | | 707/640 |
| 2013/0103644 A1 | 4/2013 | Shoens et al. | |
| 2013/0110770 A1* | 5/2013 | Stevelinck | G06Q 50/24 |
| | | | 707/609 |
| 2013/0297722 A1 | 11/2013 | Wright | |
| 2013/0311520 A1 | 11/2013 | Nakagawa | |
| 2013/0339645 A1* | 12/2013 | Barve | G06F 3/065 |
| | | | 711/162 |
| 2014/0006354 A1* | 1/2014 | Parkison | G06F 17/30194 |
| | | | 707/649 |
| 2014/0095475 A1 | 4/2014 | Su et al. | |
| 2014/0108352 A1* | 4/2014 | Ahrens | G06F 11/1456 |
| | | | 707/645 |
| 2014/0258239 A1* | 9/2014 | Amlekar | G06F 11/1402 |
| | | | 707/649 |
| 2015/0019909 A1 | 1/2015 | Griffith | |
| 2015/0120780 A1 | 4/2015 | Jain | |
| 2015/0127833 A1* | 5/2015 | Hegdal | G06F 9/5016 |
| | | | 709/226 |
| 2015/0154105 A1 | 6/2015 | Chaurasia | |
| 2015/0254240 A1 | 9/2015 | Li | |
| 2016/0092454 A1 | 3/2016 | Tao | |
| 2016/0092534 A1 | 3/2016 | Choudhury et al. | |
| 2016/0110292 A1 | 4/2016 | Choi | |
| 2016/0171029 A1 | 6/2016 | Sanvido | |

OTHER PUBLICATIONS

Susairaj, U.S. Appl. No. 15/266,340, filed Sep. 15, 2016, Final Office Action, dated Mar. 26, 2019.

Choudhury, U.S. Appl. No. 14/823,212, filed Aug. 11, 2015, Notice of Allowance, dated Apr. 19, 2019.

Tao, U.S. Appl. No. 14/849,012, filed Sep. 9, 2015, Advisory Action, dated Nov. 21, 2018.

Susairaj, U.S. Appl. No. 15/226,340, filed Sep. 15, 2016, Office Action, dated Oct. 30, 2018.

Tao, U.S. Appl. No. 14/849,012, filed Sep. 9, 2015, Office Action, dated Dec. 11, 2017.

Oracle® Database, "Performance Tuning Guide",11g Release 1 (11.1), B28274-02 Chapter 15-18, dated Jul. 2008, 500 pages.

Tao, U.S. Appl. No. 14/849,012, filed Sep. 9, 2015, Final Office Action, dated Aug. 31, 2018.

Choudhury, U.S. Appl. No. 14/823,212, filed Aug. 11, 2015, Notice of Allowance, dated Oct. 18, 2018.

Tao, U.S. Appl. No. 14/849,012, filed Sep. 9, 2015, Notice of Allowance, dated Jan. 22, 2019.

Susairaj, U.S. Appl. No. 15/266,340, filed Sep. 15, 2016, Interview Summary, dated Jan. 3, 2019.

U.S. Appl. No. 14/823,212, filed Aug. 11, 2015, Office Action, dated Apr. 23, 2018.

Tao, U.S. Appl. No. 14/849,012, filed Sep. 9, 2015, Interview Summary, dated May 3, 2018.

Choudhury, U.S. Appl. No. 14/823,212, filed Aug. 11, 2015, Interview Summary, dated Jun. 6, 2018.

Lance Ashdown et al., "Oracle? Database SQL Tuing Guide 12c Release 1 (12.1)", Data Engineering, dated 2009, IEEE, 566 pages.

Warden, Tim, "Storage Pooling, Thin Povisioning and Over-Subscription"., Las Solanas Consulting, dated Jul. 3, 2010, www.las-solanas.com storage_virtualization/thin_provisioning.php>, 4 pages.

Walrond, Dan, "Using Netcat and Tar to Quickly Transfer Files Between Machines, AKA Tar Pipe", N.D. Accessed dated Oct. 19, 2017, web.archive.org/web/20130925161957/http://toast.djw.org, 9 pgs.

Haynes, T. "Network File System (NFS) Verison 4 Minor Version 2 Protocol", IERF Tools, dated May 17, 2014, from <tools.ietf.org/html/draft-ietf-nfsv4-minorversion2-24>, 8 pages.

Free Software Foundation, Inc., "GNU Tar: An Archiver Tool", dated Sep. 24, 2013, www.gnu.org/software/tar/manual/html_node/index.html_ 6 pages.

Choudhury, U.S. Appl. No. 14/823,212, filed Aug. 11, 2015, Office Action, dated Sep. 28, 2017.

* cited by examiner

STORAGE INTEGRATED SNAPSHOT CLONING FOR DATABASE

FIELD OF THE DISCLOSURE

The present disclosure relates to techniques for copying data, generally, and, more specifically, to techniques for cloning a database using storage-level snapshot copies.

BACKGROUND

It is often useful to clone a database for testing and/or other purposes. For example, a production database may be cloned for reasons including, without limitation, deployment of a new application or an update of an existing application that uses the database, a planned operating system upgrade on a system that accesses the database, new storage for a database installation, reporting, and analysis of older data in the database.

Cloning a database may involve making a full copy of the database so that testing/development can be performed without corrupting and/or significantly degrading the performance of the original ("source") database. Copying each and every file of the database significantly increases the storage overhead of the database, especially where multiple clones are being made. In addition, copying each and every file of the database may be a time-consuming task that requires significant database downtime.

Some storage systems include snapshot capabilities that allow users to take a point-in-time image of a storage volume or file system. In contrast to a full backup, snapshots may be performed nearly instantaneously, because each and every data file is not copied when the snapshot is taken. Rather, data in the parent file system is shared with the snapshot file system until the data is modified. Thus, copies are made only for those blocks that are modified, which may drastically reduce space usage in comparison to a full backup.

One approach for managing shared resources in the parent and snapshot file systems is referred to as Copy-on-Write (COW). According to this approach, the parent and snapshot file system share each respective data block until a write request is received that modifies the respective data block. In response to receiving the write request, the location of the original data block is read, the data block is copied to a new location, and the modified data block is written to the location of the original data block.

Another approach for managing shared resources in the parent and snapshot file system is referred to as Redirect-on-Write (ROW). Similar to COW, the parent and snapshot file system share a data block until a write request is received that modifies the data block. In response to receiving the write request, the location of the original data block is read, and the modified data block is written to a new location. In contrast to COW, the original data block remains unmodified at the original location.

Storage snapshot technology is typically implemented at the storage layer, which may make it cumbersome to use for a database. In many organizations, the database system and storage systems are maintained by separate teams with different controls and commands. In order to use storage-level snapshots, several manual steps and coordination between the database administrator (DBA) and the storage administrator are typically required. For example, the steps to integrate storage-level snapshots with the database layer might include having the DBA cleanly shut down the source database or place the source database in a hot backup mode before the storage-level snapshots are taken. The storage administrator is then notified to create the storage-level snapshot. Once the storage-level snapshot is created, the storage administrator notifies the DBA. If the DBA wants to use database-centric names instead of the snapshot file names that are relevant to the storage layer, then the DBA manually creates a soft link. The DBA then generates a database script and manually edits the script to include the snapshot file names as the database file names. Once the new database is created, recovery operations are performed to recover the new database from the original database. Due to the amount of time and complexity required to integrate storage-level snapshot with the database system, many database administrators simply create full copies of the database for testing and development rather than using the storage snapshot technology of the underlying storage array.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1A:
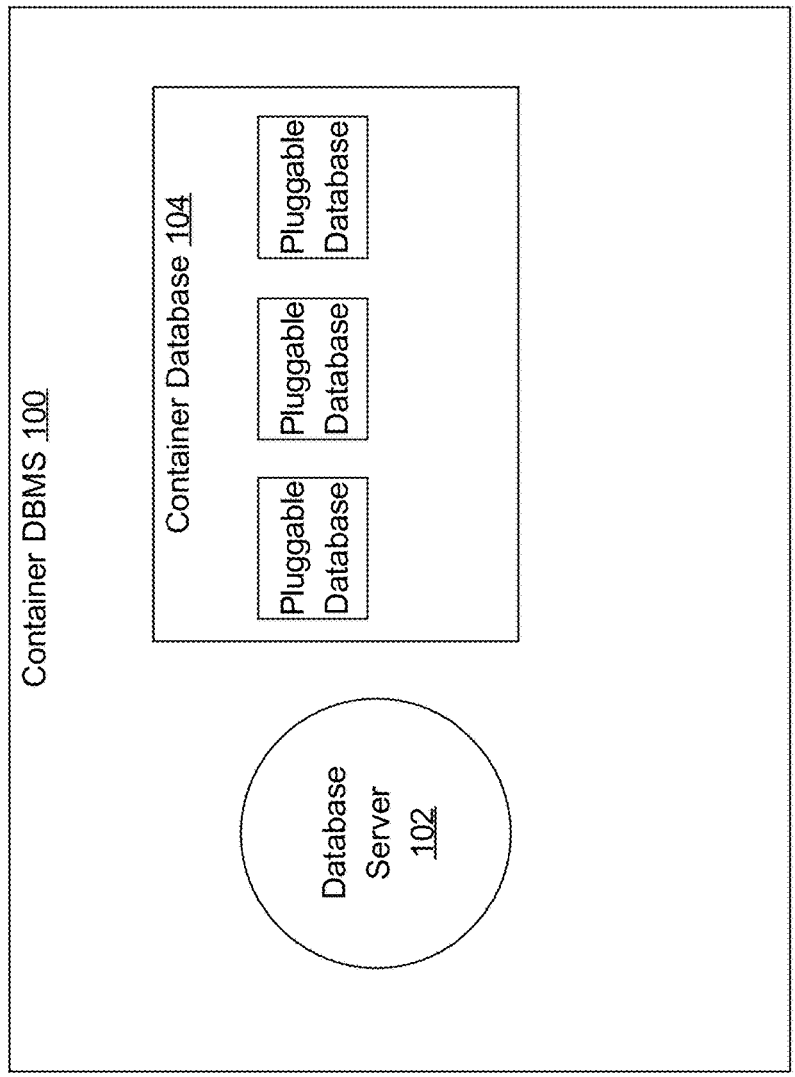
FIGS. 1A and 1B are block diagram of a container database management system upon which an embodiment may be implemented.

Techniques are described herein for storage integrated snapshot cloning within a database system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, a database may be cloned one or more times using storage-level snapshots. When a request to clone a source database is received, a snapshot copy of each respective file in the source database is generated for a copy or "clone" of the source database (a "copy" or "clone" is herein referred to as a "target" database). The snapshot copies may be generated without making a full copy of the source database, including the underlying files and data blocks. Instead, the snapshot copy of a respective file points to the same set of one or more data blocks as the respective file until at least one data block in the set of one or more data blocks is modified. Thus, the underlying data blocks in the source and target database may be the same when the clone is first generated, although the filenames and metadata may be different between the source and target database. By using snapshot copies, the amount of storage consumed by each clone may be substantially reduced, and each clone may be generated rapidly with minimal to no downtime of the source database.

Storage-level snapshots may be integrated with a database management system (DBMS) in a manner that minimizes the number of steps needed to be performed by a database administrator (DBA) and/or other database users when cloning the source database. In some embodiments, the DBMS may generate a clone in response to receiving a single database command. In response to receiving the command, the DBMS retrieves a set of one or more storage credentials for a set of one or more respective storage systems on which a set of files of the source database are stored. Each storage credential that is retrieved grants permission to the DBMS to create storage-level snapshots on a respective storage system. The DBMS sends the storage credential to the respective storage system and a request to generate a snapshot copy of each file of the source database that is stored on the respective storage system. Each respective storage system generates snapshot copies as requested by the DBMS. Once the snapshots are generated, the DBMS may present the target database as a separate database than the source database, even though each database may point to substantially the same data blocks on the set of storage systems.

Database System Overview

According to some embodiments, the techniques described herein are implemented by a DBMS. A DBMS comprises a set of processes and/or threads that manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Container Database Management System

According to some embodiments, the techniques described herein may be used in the context of a container database. FIG. 1 depicts an example container DBMS upon which an embodiment may be implemented. Referring to FIG. 1A, container DBMS 100 comprises database server 102 and container database 104. Database server 102 represents a combination of software and resources on one or more computer systems that manage container database 104. Database server 102 may comprise a single server instance or multiple instances, depending on the particular implementation. An example of a database server and computer system upon which a database server may run are described in the "Database System Overview" and "Hardware Overview" sections provided herein, although embodiments are not limited to these exact platforms.

Figure 1B:
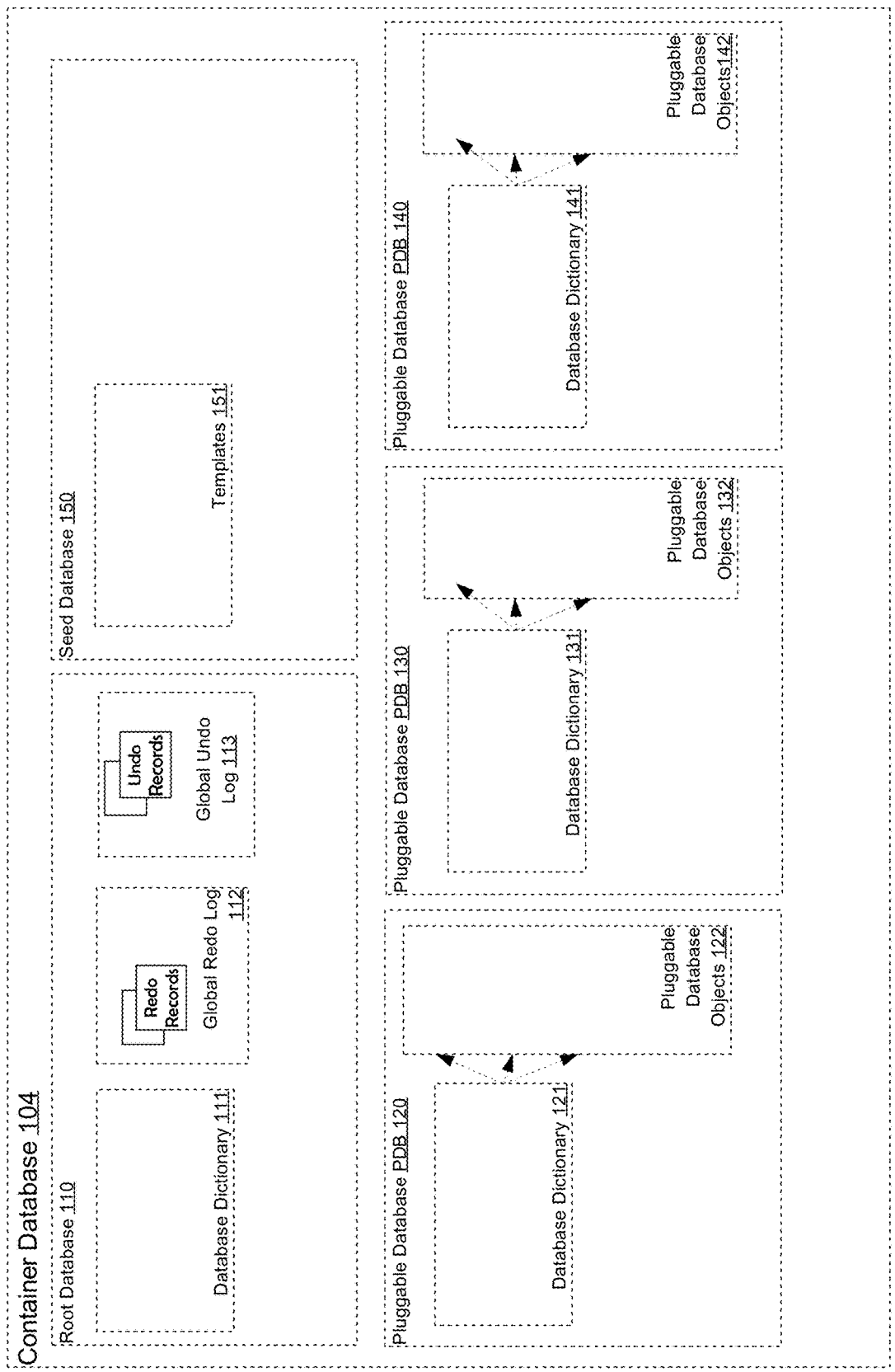

FIG. 1B depicts a more detailed view of container database 104 according to an embodiment. Container database 104 contains multiple databases that are hosted and managed by database server 102. The databases include root database 110, pluggable databases (PDBs) 120 to 140, representing one or more PDBs, and seed database 150. Root database 110 is a database that is used by the Database Server 102 to globally manage container database 100, and to store metadata defining pluggable databases and/or defining common database objects that may be shared by different pluggable databases that belong to the same container database. Example common database objects that may be shared may include, without limitation, global redo log 112 and global undo log 113, which maintain redo and undo records, respectively, for pluggable databases 120 to 140.

Each pluggable database includes its own database dictionary. PDB 120 includes database dictionary 121, PDB 130 includes database dictionary 131, and PDB 140 includes database dictionary 141. A database dictionary of the pluggable database may be referred to herein as a pluggable database dictionary. A database object defined by a pluggable database dictionary that is not a common database object is referred to herein as a pluggable database object. Pluggable database objects 122, which are defined by database dictionary 121, are database objects that belong to PDB 120 and are not shared by other PDBs. Similarly, database dictionary 131 defines pluggable database objects 132 that belong to PDB 130, and database dictionary 141 defines pluggable database objects 142 that belong to PDB 140.

One function facilitated by root database 110 is to define pluggable databases within container database 100. Similar to pluggable databases, root database 110 includes database dictionary 111. Database dictionary 111 contains metadata that defines various aspects of container database 100 needed to administer container database 100 and the pluggable databases contained therein, including metadata that defines PDB 120, PDB 130, and PDB 140.

Seed database 150 includes one or more templates 151 that the container database management system can use to create new PDBs. The information in templates 151 may include, without limitation, database options, initialization parameters, and storage attributes (for datafiles, tablespaces, control files, redo logs and/or other database objects). The container database management system may create a new PDB by cloning seed database 150 or one of its templates.

Container database 104 may be used as part of a multi-tenant system where different tenants have access to different PDBs. This allows the different tenants to share resources such as background processes, system and process memory, and/or certain metadata while restricting access to each PDB to an authorized tenant.

Storage System Overview

According to some embodiments, a DBMS/database server may interface with a set of storage systems to store one or more databases, such as the container and pluggable databases described herein. A storage system may comprise a set of one or more processes executing on a computing device that receive requests, process the requests, and store data in and/or return data from one or more files the storage system maintains. Example storage systems may include, without limitation, NetApp filers, network-attached storage (NAS) devices, ZFS storage appliances, logical volume managers, and other types of file systems.

In order to connect to and communicate with the set of storage systems, a database server may use a set of one or more storage communication protocols. Example protocols may include, without limitation, Network File System (NFS), Internet Small Computer System Interface (iSCSI), Common Internet File System (CIFS), and Server Message Block (SMB). The database server may submit requests, such as authentication and I/O requests, to the storage systems through the storage communication protocols.

In some embodiments, a database server may use different storage communication protocols to communicate with different storage systems within the set of storage systems that store the one or more databases. For example, part of a database may be stored on an Automatic Storage Management Cluster File System (ACFS) and another part of a database may be stored on a ZFS system. The database server may generate and send commands to the ACFS in accordance with a first communications protocol used for communicating with ACFS systems and to the ZFS system in accordance with a second, different communications protocol used for communicating with ZFS systems.

A storage system may be configured to implement storage-level snapshots, according to some embodiments. When the storage systems receives requests to generate a snapshot from a database server, the storage system processes the requests to determine the files for which snapshot copies are to be generated and generates the snapshot copies within the storage system. Techniques for generating and maintaining storage-level snapshots are described in further detail below.

A storage system may be configured to authenticate a database server before allowing the database server to generate storage-level snapshots, according to some embodiments. The storage system may receive storage credentials from a database server and, in response, verify that the storage credentials are valid. If the storage credentials are successfully verified, then the storage system may process requests from the database server to generate storage-level snapshots. If the storage credentials are not successfully verified (e.g., the database server provided invalid storage credentials), then the storage system may prevent the database server from generating storage level snapshots. In some cases, each storage system in the set of storage systems may have different storage credentials for authenticating a database server.

A storage credential, as used herein, may comprise any data that a database server may use to access a respective storage system (or volume on the storage system) and to make snapshot copies on the respective storage system. Example storage credential data may include, without limitation, a password for authenticating the database server by the storage device, a hostname that identifies the respective storage volume, and a username for the database server to access the storage volume. Storage credentials may be administered separately from database credentials. For example, a set of security or storage administrators may be responsible for managing access to a storage array, while a different set of database administrators may be responsible for managing access to a database. The database administrators may not have access to the storage credentials and/or the storage administrators may not have access to database credentials, depending on how the system is implemented.

Storage-Level Snapshots

A file is a collection of data blocks and headers. Creating a full copy of a file involves duplicating the file header and data blocks. This approach is effective and simple, but expensive in terms of the amount of time and storage needed to make the copy. A snapshot copy, by contrast, only involves copying the file header without duplicating the data blocks of the file. Thus, the snapshot copy of a file is a virtual copy which points to at least some of the same data blocks as the original, source file. Data blocks are duplicated when a modification to the data block is made. This allows for thin provisioning with much more efficient storage and minimal I/O to create copies.

Figure 2A:
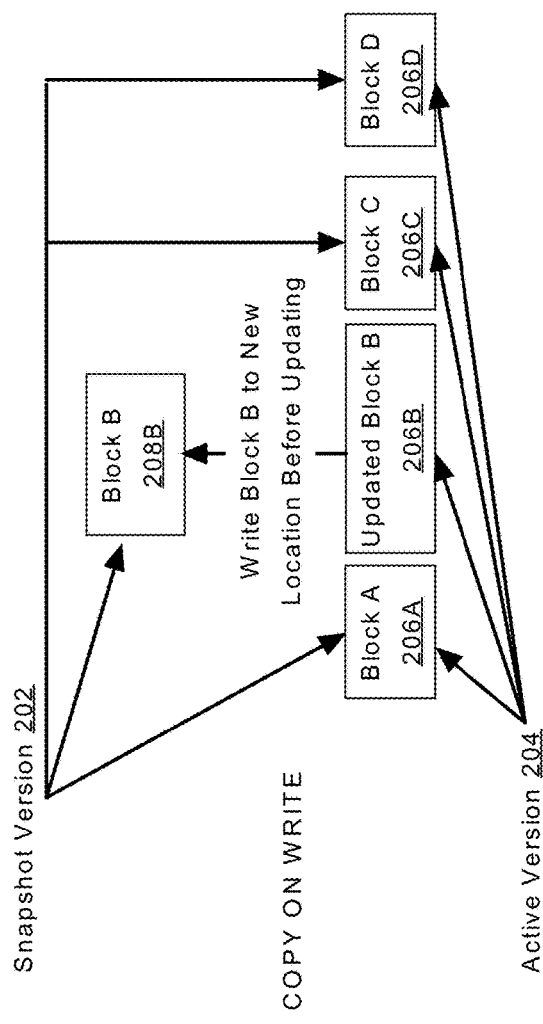
FIGS. 2A and 2B are block diagrams depicting example approaches for managing snapshots of files, according to an embodiment.

In some embodiments, a storage system may generate and manage snapshot copies by applying a Copy-on-Write (COW) approach. With COW, the source file and target file point to the same data blocks until a request to modify at least one data block is received. In response to the request, the location of the original data block is read, the data block is copied to a new location, and the modified data block is written to the location of the original data block. FIG. 2A is a block diagram depicting an example approach for managing snapshots according to COW. Snapshot version 202 is a snapshot copy of a file that initially points to blocks 206a, 206b, 206c, and 206d. After the snapshot is taken, a request to update block 206b is received. The before-change block is copied to a new location (block 208b) within the storage system, and the updated version of block B is written to the original location. Snapshot version 202 is also updated to point to the new location of block B rather than the original location. Accordingly, snapshot version 202 points to blocks 206*a*, 208*b*, 206*c*, and 206*d*. Active version 204 of the file points to blocks 206*a*, 206*b*, 206*c*, and 206*d*. As other blocks are updated, the before-change blocks are copied to the new locations, and snapshot version 202 is updated to point to the blocks at their new locations.

Figure 2B:
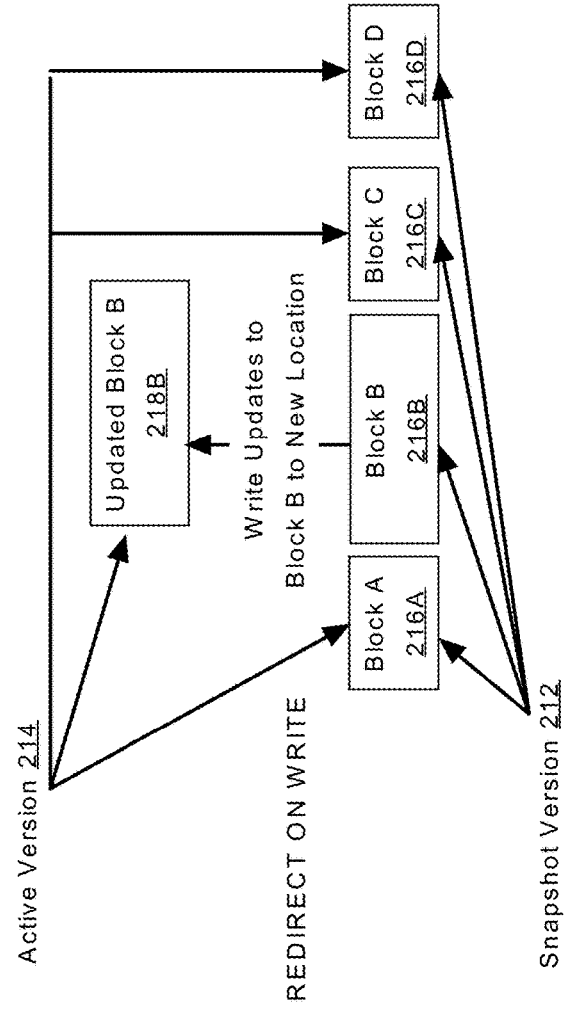

In some embodiments, a storage system may generate and manage snapshot copies by applying a Redirect-on-Write (ROW) approach. With ROW, the source file and target file point to the same data blocks until a request to modify at least one data block is received. In response to the request, the updated version of the block is written to a new location, and the before-change version of the block remains at the original location. FIG. 2B is a block diagram depicting an example approach for managing snapshots according to ROW. Snapshot version 212 is a snapshot copy of a file that point to blocks 216*a*, 216*b*, 216*c*, and 216*d*. After the snapshot is taken, a request to update block 216*b* is received. The updated block is written to a new location within the storage system (block 218*b*). Once the change has been written, active version 214 points to blocks 216*a*, 218*b*, 216*c*, and 216*d*, and snapshot version 212 remains pointing to blocks 216*a*, 216*b*, 216*c*, and 216*d*. As other blocks are updated, active version 214 points to the updated versions of the blocks at the new locations, while snapshot version 212 remains pointing to the same blocks.

The snapshot version of a file may be a read-only version of the file. Although blocks for the snapshot version may be moved, such as the case with COW, the content of the blocks are preserved as they were at the time that the snapshot was taken. Any update to the block causes a copy of the block to be generated such that the read-only version of the block is preserved. Thus, in FIG. 2A, the read-only version of Block B is moved to a different location to preserve the block, and in FIG. 2B, the read-only version of Block B remains at the same location while the updated version is written to a different location.

Storage-level snapshots are implemented at the storage layer. Thus, storage systems may generate and maintain the snapshots in response to receiving requests from a DBMS. The storage systems may generate and maintain the snapshots without being aware of how a database managed by the DBMS is structured.

Multi-Snapshot Management

A storage system may support multiple, coexisting snapshots. For example, the DBMS may request that storage system create multiple snapshots of a file system in order to create multiple clones of a source database. The number of snapshots that a particular storage system supports may vary from implementation to implementation and based on the type of storage systems that are used to store database data.

When there are multiple storage-level snapshots, each snapshot may include pointers to data blocks based on the point-in-time at which the snapshot was taken. For example, if a first snapshot is taken at time t1, then the storage-level snapshot would point to data blocks on the storage system as they existed at time t1 (although the data blocks may be moved in accordance with the COW approach). A second snapshot may then be taken at time t2, and the second snapshot would point to data blocks on the storage system as they existed at time t2. Similarly, other snapshots may be taken at different times on the same file system or storage volume, with each snapshot pointing to data blocks as they existed at the time the respective snapshot was taken.

Different snapshots may point to the same data block within a storage system. For example, if a first storage-level snapshot is taken at time t1, and a second storage-level snapshot is taken at time 2, then the first snapshot and the second snapshot may both include pointers to data blocks that have not changed between time t1 and time t2. Another snapshot taken at time t3 may also point to one or more of the same data blocks as the first and/or second snapshot.

Figure 3:
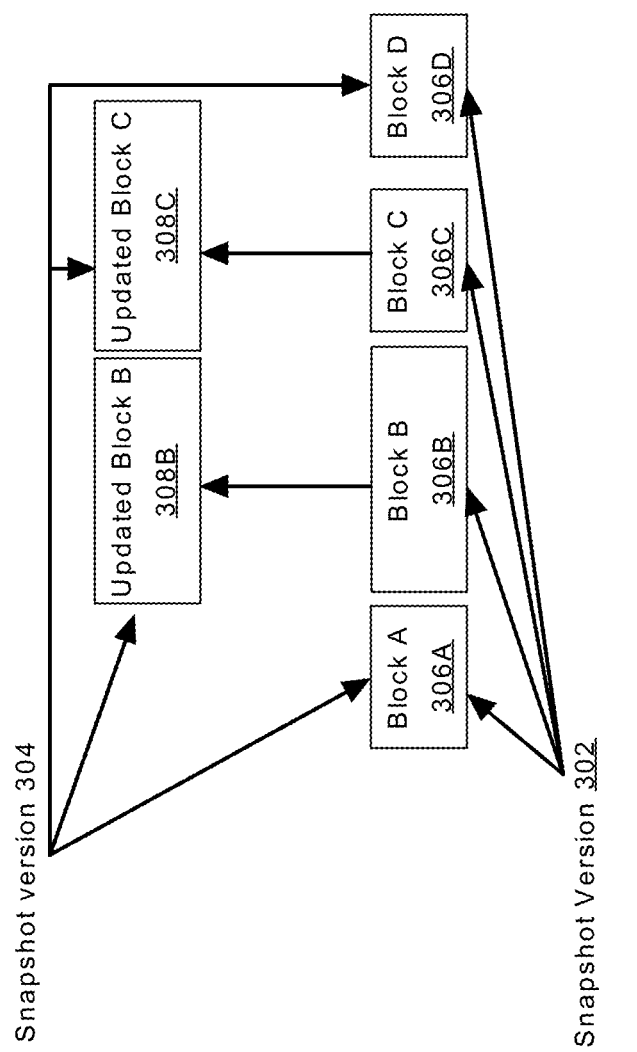
FIG. 3 is a block diagram depicting an example of different snapshots taken at different points-in-time, according to an embodiment.

FIG. 3 is a block diagram depicting an example of different snapshots taken at different points-in-time, according to an embodiment. Snapshot 302 is a storage-level snapshot, taken at time t1 that includes pointers to blocks 306*a*, 306*b*, 306*c*, and 306*d*. Snapshot 304 is a storage-level snapshot, taken at time t2. Blocks 306*b* and 306*c* are updated in an active version of the file system between times t1 and t2, while blocks 306*a* and 306*d* are not updated. Accordingly, snapshot 304 includes pointers to blocks 306*a*, 308*b*, 308*c*, and 306*d*.

Database Clones with Snapshot Copy

Figure 4:
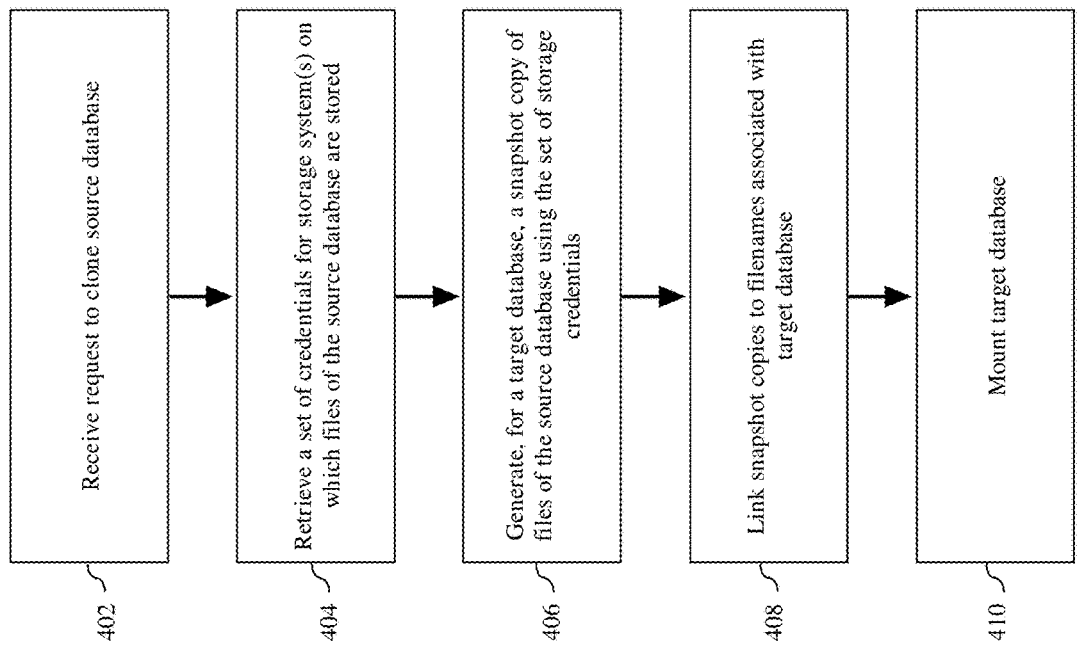
FIG. 4 is a flowchart depicting an example process for cloning a database using storage-level snapshots, according to an embodiment.

FIG. 4 is a flowchart depicting an example process for cloning a database using storage-level snapshots, according to an embodiment. In step 402, a database server receives a request to clone a database. The request may explicitly or implicitly indicate that storage-level snapshots should be used to generate the clone. In an example embodiment, the request is a database command that conforms to a SQL syntax. An example database command is given in Table 1 below.

TABLE 1

EXAMPLE DATABASE COMMAND FOR GENERATING CLONE WITH SNAPSHOT COPY create pluggable database TESTDB1
from DB1 snapshot copy In the database command depicted in Table 1, the "snapshot copy" clause indicates that storage-level snapshots should be used when generating database TESTDB1, which is a clone of database DB1. When the database server receives this command, the database server may generate the clone, using storage-level snapshots as described in further detail herein. If the "snapshot copy" clause is not included in the command, then the database server may generate the clone by making a full copy of the source database and without using storage-level snapshots.

In step 404, the database server retrieves a set of one or more storage credentials for a set of one or more storage systems on which files of the source database are located. The database server may determine which files belong to the source database and where the source files are located based on the metadata defining the objects that belong to a source database. Once the database server determines where the files of the source database are stored, the database server retrieves the appropriate storage credentials for generating snapshot copies of the files. For example, if the database server determines that a source database is located on storage systems A, B, and C, then the database server may retrieve storage credentials for each of storage systems A, B, and C. The storage credentials for a respective storage system grant permission to the database server to generate snapshot copies on the respective storage system. The storage credentials may be stored in a keystore, as described in further detail below in the "Transparent Storage of Storage Credentials" section. To retrieve the credentials, the database server may query the keystore with the identity of a storage system. Continuing with the present example, the database server may query the keystore for the storage credentials of storage systems A, B, and C to retrieve the storage credentials for each of these storage systems. If the storage credentials are encrypted, then the database server may retrieve a set of one or more encryption keys to decrypt the credentials at this step.

In step 406, the database server sends to each storage system a respective set of one or more storage credentials and a set of one or more commands to generate a storage-level snapshot of a file system or volume. The manner in which the DBMS creates the storage-level snapshots may vary based on the type of storage system that stores data. For instance, the format and number of the commands that are sent to each storage system may depend on the type of storage systems storing the source files. Example command formats are given in the "Example Database Commands for Generating Snapshot Copies" section. If source files are stored on different types of storage systems, the database system may generate the snapshot copies using commands of different formats. For example, assume the source database is stored on storage systems A, B, and C where storage system A is a ZFS system, storage system B is an ACFS system, and storage system C is a NetApp system. The database server may send a first set of storage credentials and storage commands according to a first format to storage system A, a different set of storage credentials and storage commands according to a second format to storage system B, and a different set of storage credentials and storage commands according to a third format to storage system C.

In step 408, the database server links the snapshot files to a file name associated with the target database. The file names to which the storage-level snapshots are linked may be based on a file name provided by the user when requesting a clone. For example, the snapshot files may be linked to the filename TESTDB1 for the database command depicted in Table 1 above. In addition or alternatively, the filenames for files in the target database may be based on the filenames in the source database. For instance, the database server may replace all instances of DB1 in the source database filenames with TESTDB1 for the query depicted in Table 1. A file_name_convert clause may be used to generate the filenames for the target database and link the snapshot files to respective filenames.

In step 410, the database server mounts the target database. Once the target database is mounted, the files of the target database may appear and be accessed as if they were full copies of the source files, even though storage-level snapshots were used to generate the target database. Accordingly, the source file in the source database and its respective snapshot copy in the target database may point to the same set of data blocks in the underlying storage system when the target database is first mounted. As the files in the source database and/or target database are modified, the data blocks are updated according to the COW or ROW approach, and the files begin to diverge (e.g., point to different data blocks).

Steps 404 to 410 may be performed by a DBMS in response to a single request received at step 402 without any human intervention. Thus, in response to a single database command, the DBMS may leverage storage-level snapshots to generate a clone that may be viewed and accessed by a database user in the same manner as if the files were regular full copies.

Cloning in a Multitenant Environment

Storage-level snapshots may be used to create clones of PDBs within a container database. In the context of a PDB, a home directory associated with a particular database instance may be shared between the source database (source PDB) and the target database (target PDB). Information about the database files whose snapshot has been created is known to the database instance that is executing the SQL command to generate the snapshot copies and does not require any intervention from the user. Failure to create one of the snapshots can abort the whole operation and leave the storage in the original state. The container database includes metadata that may be used to create the new target database using storage-level snapshots. The container database further has access to any relevant redo log files to recover the newly created database.

Figure 5:
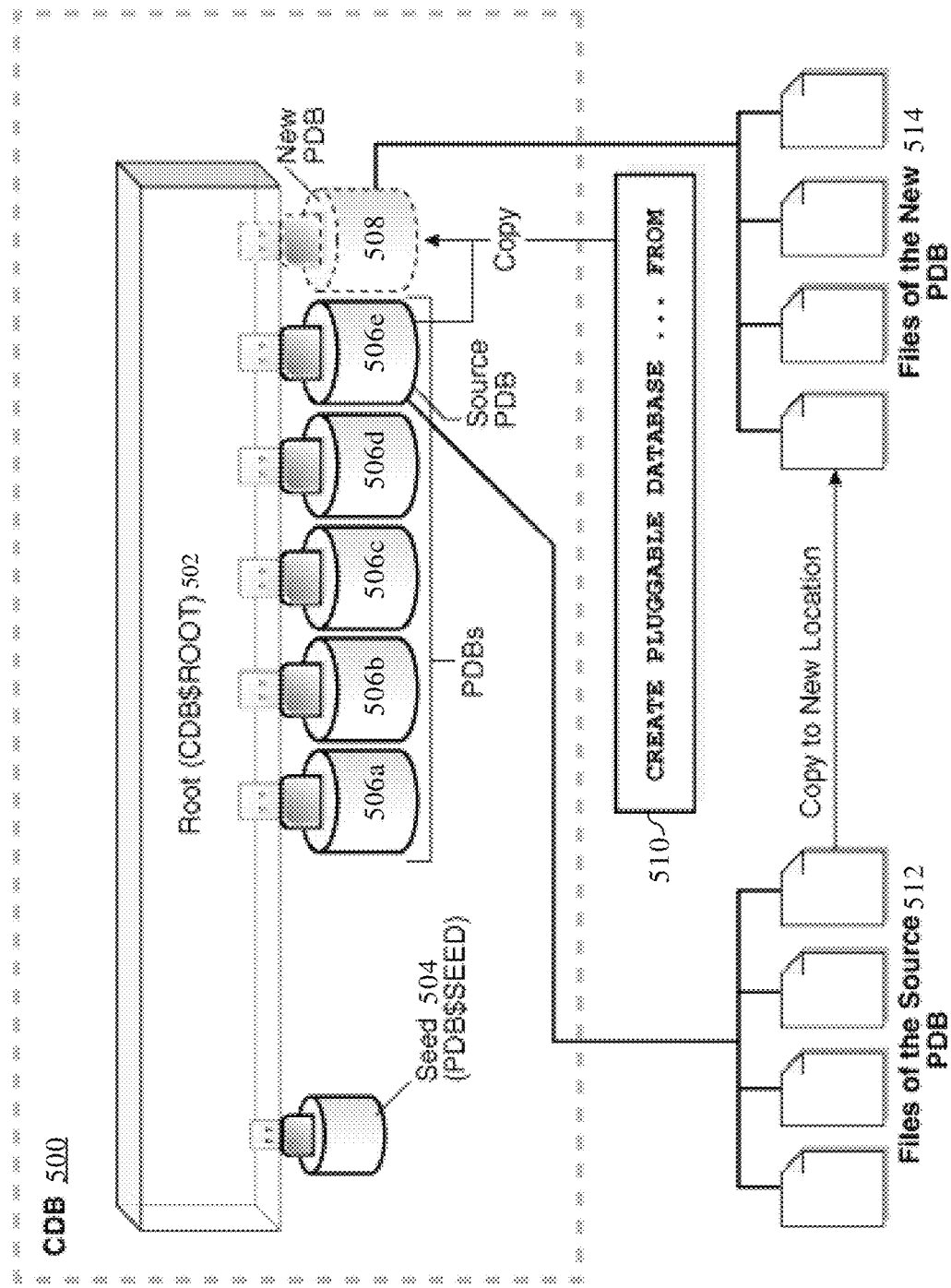
FIG. 5 is a block diagram depicting an example clone of a pluggable database using snapshot copies, according to an embodiment.

FIG. 5 is a block diagram depicting an example clone of a pluggable database using snapshot copies, according to an embodiment. CDB 500 is a container database comprising root database 502, seed database 504, and PDBs 506*a* to 506*e*. When command 510 is received requesting a clone of source PDB 506*e*, the DBMS does not make a complete copy of the source data files 512 of PDB 506*e*, but creates a storage-level snapshot of the underlying file system and uses the snapshot files to create PDB clone 508. Accordingly, files 514 of PDB clone 508 are snapshot copies of source files 512 when PDB clone 508 is first created. Files of non-source PDBs 506*a* to 506*d* are not copied in response to request 510.

Upon creation, PDB clone 508 is mounted/plugged into the same CDB 100 as PDBs 506*a* to 506*e*. PDB clone 508 may include its own data dictionary that includes metadata referencing the storage-level snapshots In addition, PDB clone 508 may share common database resources with PDBs 506*a* to 506*e* as defined by root database 502. Thus, the common database resources may be shared with both the source PDB (PDB 506*e*) from which snapshot copies were generated as well as other PDBs (PDBs 506*a* to 506*d*) that are not source PDBs.

Figure 6:
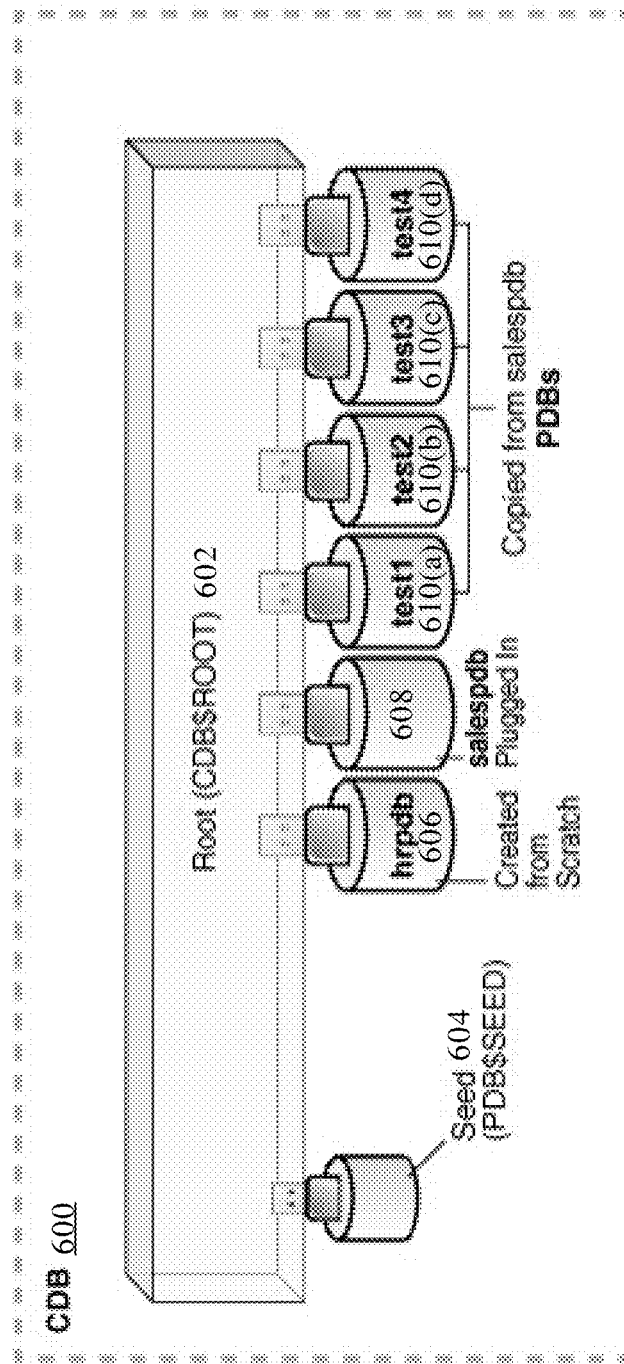
FIG. 6 is a block diagram depicting an example of multiple clones of a pluggable database using snapshot copies, according to an embodiment.

Multiple clones may also be generated for PDBs within a container database. FIG. 6 is a block diagram depicting an example of multiple clones of a pluggable database using snapshot copies, according to an embodiment. CDB 600 is a container database including root database 602, seed database 604, hrpdb 606 and salespdb 608. Test PDBs 610(*a*) to 610(*d*) are clones of salespdb 608 that may be generated using storage-level snapshots. PDBs 610(*a*) to 610(*d*) may be generated at the same point in time or at different points in time, depending on the particular implementation. Snapshots for each of PDBs 610(*a*) to 610(*d*) may include pointers that point to one or more of the same data blocks as one or more other snapshots, such as described in the "Multi-Snapshot Management" section above. Test PDBs 610*a* to 610(*d*) are added to the same container database as hrpdb 606 and salespdb 608.

Transparent Storage of Storage Credentials

In order to grant a DBMS permission to create storage-level snapshots, database users may store a set of storage credentials associated with a storage system in a database keystore. A keystore may generally comprise any repository for storing credentials for accessing the storage systems. The keystore may be logically and or physically separate storage from the database for which the credentials are maintained. The keystore may be a hardware keystore, such as a hardware security module (HSM), that is physically separate from database storage, a software keystore that is logically separated from a database, or some combination thereof.

Table 2 below lists example database commands that may be used to generate and add storage credentials to the keystore.

TABLE 2

EXAMPLE DATABASE COMMANDS FOR ADDING STORAGE
CREDENTIALS TO A KEYSTORE (1) ADMINISTER KEY MANAGEMENT CREATE KEYSTORE
   <location> IDENTIFIED BY <id_name>;
(2) ADMINISTER KEY MANAGEMENT SET KEYSTORE OPEN
   IDENTIFIED BY <id_name>;
(3) ADMINISTER KEY MANAGEMENT ADD SECRET
   '<storage_password>' FOR CLIENT '<hostname>'
   USING TAG '<storage_username>' IDENTIFIED BY
   <id_name> WITH BACKUP;

The first command of Table 2 creates a keystore with a specified name at a specified storage location. The second command opens the keystore by the identified name. The third command adds storage credentials (a storage password and username) for a storage system with a specified hostname in a specified keystore.

Maintaining credentials in an external keystore allows separation of responsibilities, as a single administrator may be prevented from having access to all sensitive data. For example, a security/storage administrator may maintain and input the storage credentials without revealing the storage credentials to the database administrator. Database users may be prevented from querying the keystore and viewing the storage credentials. During a clone operation, the database server may retrieve and use the storage credentials without revealing the storage credentials to the requesting database user. Thus, database users may use the storage credentials to clone a database without compromising the security of the storage credentials. Once the storage administrator has input the storage credentials, the storage credentials may be maintained by the DBMS in secret and used to generate storage-level snapshots without any further intervention from the storage administrator. The credentials may be reused by the DBMS to generate storage-level snapshots without requiring the storage administrator to manually input the storage level credentials each time a clone is generated.

Data stored in the keystore may be encrypted to prevent unauthorized users/processes from obtaining access to the storage credentials. Example encryption protocols that may be used to encrypt storage credential data may include, without limitation, triple encryption standard (TES) and advanced encryption standard (AES). To decrypt the storage credential data, the DBMS may store a master encryption key for the keystore. When a server receives a request to clone a source database, the database server retrieves the master encryption key and uses it to decrypt storage credentials for one or more storage systems on which files for the source database are stored.

For a container database management system, storage credentials may be stored in a secure keystore once per container database. For example, if a DBMS manages multiple container databases, including container databases CDB1 and CDB2, each of the container databases may be associated with a different keystore. Thus, CDB1 stores a first set of storage credentials in a first keystore, and CDB2 stores a second set of storage credentials in a second keystore. CDB1 may be prevented from accessing the keystore associated with CDB2, and CDB2 may be prevented from accessing the keystore associated with CDB1.

Example Database Commands for Generating and Destroying Snapshot Copies

The DBMS may store a set of command templates for generating snapshot copies on different storage systems. When processing a request to clone a source database, a database server may retrieve storage system identification data for the one or more storage systems on which source files of the database are stored. Based on the storage system identification data, the database server may determine the format of the commands to process for generating snapshots on the storage system. For example, the storage system identification data may identify the type of storage system that stores a datafile for the source database. In response to determining the type of storage system, a database server may use a corresponding command template to generate and send a set of commands that is compatible with the corresponding storage system.

Tables 3-5 below depict example command sets for generating and maintaining clones using storage-level snapshots, according to an embodiment. Although the commands are for specific storage system platforms, embodiments are not limited to these platforms. The example command sets are given by way of illustration and not by way of limitation. Different command sets and storage system platforms may also be used.

Table 3 depicts example command sets for ZFS storage appliances.

TABLE 3

EXAMPLE COMMAND SETS FOR
MANAGING ZFS SNAPSHOTS

| COMMAND SET | FUNCTION |
|---|---|
| # zfs snapshot sourcefile@snapshotname | Creates ZFS snapshot named snapshotname from sourcefile and a create clone that is named clonename from the snapshot |
| # zfs clone sourcefile@snapshotname clonename | |
| # zfs destroy clonename | Destroys specified clone in ZFS storage |

A database server may process commands listed in Table 3 when creating or destroying storage-level snapshots on a ZFS storage appliance. When processing the commands, the database server includes the corresponding source file, snapshot, and/or clone name database. The database server generates a unique volume tag that can be used by ZFS storage to create snapshot volume, which the database may mount and link to a PDB that has been provisioned as a snapshot clone.

Table 4 depicts example command sets for ACFS storage systems.

TABLE 4

EXAMPLE COMMAND SETS FOR
MANAGING ACFS SNAPSHOTS

| COMMAND SET | FUNCTION |
|---|---|
| acfsutil snap create <snapshot> <mount_point> | Creates ACFS snapshot of a file system where <snapshot> specifies a name for the snapshot and <mount_point> specifies the directory where the file system is mounted |
| acfsutil snap delete <snapshot> <mount_point> | Destroys ACFS snapshot of a file system where <snapshot> specifies a name of the snapshot to be deleted and <mount_point> specifies the directory associated with the snapshot |

A database server may process the commands listed in Table 4 when creating or destroying storage-level snapshots on an ACFS storage system. When generating the commands, the database server includes the corresponding snapshot names and mount points corresponding to source files of the source database.

Table 5 depicts example command sets for NetApp storage systems.

TABLE 5

EXAMPLE COMMAND SETS FOR
MANAGING NETAPP SNAPSHOTS

| COMMAND SET | FUNCTION |
| --- | --- |
| ntap> vol status<br>ntap> snap create -V<br><parent_vol_name><br><snapshot_vol_name><br>ntap> vol clone create<br><clone_vol_name> -s none -b<br><parent_vol_name><br><snapshot_vol_name><br>ntap> vol status<br>ntap> vol offline<br><clone_vol_name><br>ntap> vol destroy<br><clone_vol_name><br>ntap> snap delete<br><primary_vol_name><br><clone_vol_name> | Check status of volume, create volume snapshot and volume clone, where <parent_vol_name> identifies the source volume and <snapshot_vol_name> identifies a name for the snapshot and <clone_vol_name identifies a name for the clone<br>Check status of volume, take volume offline, destroy volume and delete snapshot cloned volume |

A database server may process the commands listed in Table 5 when creating or destroying storage-level snapshots on a NetApp storage system. When generating the commands, the database server includes the corresponding volume name where source file(s) are stored, a name for the snapshot volume and a name for the clone.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
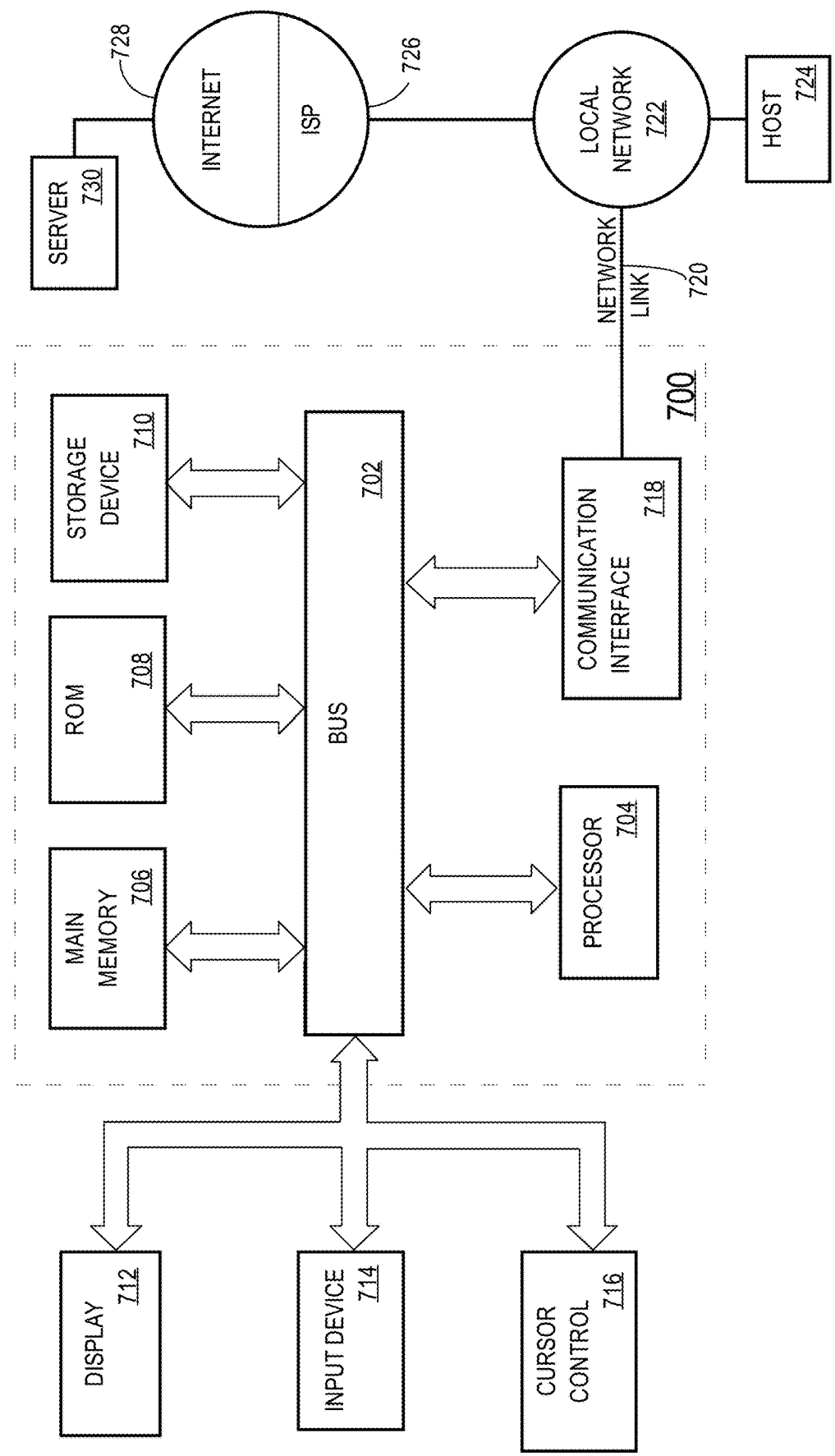
FIG. 7 is a block diagram depicting a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for cloning a database, the method comprising:
    receiving, at a database server, a statement specifying to create a target database as a clone of a source database; wherein a set of files included in the source database is stored on at least one storage system;
    wherein said source database includes a database dictionary comprising:
        metadata that defines database objects of said source database, said database objects of said source database including one or more tables;
        metadata that defines the set of files as storing data for said database objects of the source database;
    before receiving, at the database server, said statement specifying to create the target database as a clone of the source database, receiving a set of one or more storage credentials for the at least one storage system on which the set of files of the source database is stored, said storage credentials granting permission to create snapshot copies of files on said at least one storage system;
    in response to receiving the set of one or more storage credentials for the at least one storage system on which the set of files of the source database is stored, storing the set of one or more storage credentials in a keystore;
    in response to receiving, at the database server, said statement specifying to create the target database as a clone of the source database:
        retrieving the set of one or more storage credentials from the keystore;
        generating a plurality of snapshots to include in the target database by using the set of one or more storage credentials, wherein generating said plurality of snapshots includes generating, for each file of said set of files, a respective snapshot copy of said each file, wherein said respective snapshot copy belongs to said plurality of snapshots, wherein each respective snapshot copy points to a set of one or more data blocks in said each file until at least one data block in said set of one or more data blocks in said each file is modified;
        creating a target database dictionary for said target database, said target database dictionary comprising:
            metadata that defines database objects of said target database, said database objects of said target database including one or more tables;
            metadata that defines said plurality of snapshots as storing data for database objects of the target database.

2. The method of claim 1, further comprising preventing a database user from viewing the set of one or more storage credentials that are stored in the keystore; wherein the storage credentials are stored in the keystore in an encrypted format.

3. The method of claim 1, wherein generating the snapshot copy of each respective file in the set of files of the source database comprises:
    the database server sending a first command to a first storage system to generate a snapshot copy for a first subset of the set of files;
    the database server sending a second command to a second storage system to generate a snapshot copy for a second subset of the set of files;
    wherein a format of the first command is different than a format of the second command.

4. The method of claim 1,
    wherein the source database is a first pluggable database that is included in a container database;
    wherein the target database is a second pluggable database that is added to the container database in response to receiving, at the database server, said statement specifying to create the target database as a clone of the source database.

5. The method of claim 1, wherein the set of data blocks includes one or more data blocks from the source database at a first point-in-time, the method further comprising:
receiving, at the database server, a statement specifying to create another target database as a clone of the source database;
in response to receiving, at the database server, the statement specifying to create the another target database as a clone of the source database:
generating, for the another target database, a second snapshot copy of each respective file in the set of files of the source database;
wherein each second snapshot copy points to another set of one or more data blocks;
wherein the another set of one or more data blocks includes one or more data blocks from the source database at a second point-in-time that is different than the first point-in-time;
wherein the another set of one or more data blocks includes at least one data block from the one or more data blocks from the source database at the first point-in-time.

6. The method of claim 1, further comprising:
receiving, at the database server, a request to modify a particular file in at least one of the source database or the target database;
in response to receiving, at the database server, the request to modify the particular file in at least one of the source database or the target database, generating a copy of at least one data block in the set of one or more data blocks for the particular file.

7. The method of claim 1, further comprising generating a target filename for each snapshot copy in the target database based, at least in part, on a source filename of a respective source file in the source database.

8. The method of claim 1, wherein said statement specifying to create the target database as a clone of the source database is a single database command.

9. The method of claim 8, wherein the database command conforms to a structured query language syntax and includes a clause for specifying that a clone of the source database should be a snapshot copy.

10. One or more non-transitory computer-readable media storing instructions, which, when executed by one or more processors, cause one or more computing devices to perform:
receiving, at a database server, a statement specifying to create a target database as a clone of a source database;
wherein a set of files included in the source database is stored on at least one storage system;
wherein said source database includes a database dictionary comprising:
metadata that defines database objects of said source database, said database objects of said source database including one or more tables;
metadata that defines the set of files as storing data for said database objects of the source database;
before receiving, at the database server, said statement specifying to create the target database as a clone of the source database, receiving a set of one or more storage credentials for the at least one storage system on which the set of files of the source database is stored, said storage credentials granting permission to create snapshot copies of files on said at least one storage system;
in response to receiving the set of one or more storage credentials for the at least one storage system on which the set of files of the source database is stored, storing the set of one or more storage credentials in a keystore;
in response to receiving, at the database server, said statement specifying to create the target database as a clone of the source database:
retrieving the set of one or more storage credentials from the keystore;
generating a plurality of snapshots to include in the target database by using the set of one or more storage credentials, wherein generating said plurality of snapshots includes generating, for each file of said set of files, a respective snapshot copy of said each file, wherein said respective snapshot copy belongs to said plurality of snapshots, wherein each respective snapshot copy points to a set of one or more data blocks in said each file until at least one data block in said set of one or more data blocks in said each file is modified;
creating a target database dictionary for said target database, said target database dictionary comprising:
metadata that defines database objects of said target database, said database objects of said target database including one or more tables;
metadata that defines said plurality of snapshots as storing data for database objects of the target database.

11. The one or more non-transitory computer-readable media of claim 10, further storing instructions, which, when executed by the one or more processors, cause the one or more computing devices to perform:
preventing a database user from viewing the set of one or more storage credentials that are stored in the keystore;
wherein the storage credentials are stored in the keystore in an encrypted format.

12. The one or more non-transitory computer-readable media of claim 10, wherein instructions for generating the snapshot copy of each respective file in the set of files of the source database comprise instructions for:
the database server sending a first command to a first storage system to generate a snapshot copy for a first subset of the set of files;
the database server sending a second command to a second storage system to generate a snapshot copy for a second subset of the set of files;
wherein a format of the first command is different than a format of the second command.

13. The one or more non-transitory computer-readable media of claim 10,
wherein the source database is a first pluggable database that is included in a container database;
wherein the target database is a second pluggable database that is added to the container database in response to receiving, at the database server, said statement specifying to create the target database as a clone of the source database.

14. The one or more non-transitory computer-readable media of claim 10, wherein the set of data blocks includes one or more data blocks from the source database at a first point-in-time, the one or more non-transitory computer-readable media further storing instructions, which, when executed by the one or more processors, cause the one or more computing devices to perform:
receiving, at the database server, a statement specifying to create another target database as a clone of the source database;

in response to receiving, at the database server, the statement specifying to create the another target database as a clone of the source database:
  generating, for the another target database, a second snapshot copy of each respective file in the set of files of the source database;
wherein each second snapshot copy points to another set of one or more data blocks;
wherein the another set of one or more data blocks includes one or more data blocks from the source database at a second point-in-time that is different than the first point-in-time;
wherein the another set of one or more data blocks includes at least one data block from the one or more data blocks from the source database at the first point-in-time.

15. The one or more non-transitory computer-readable media of claim 10, further storing instructions, which, when executed by the one or more processors, cause the one or more computing devices to perform:
  receiving, at the database server, a request to modify a particular file in at least one of the source database or the target database;
  in response to receiving, at the database server, the request to modify the particular file in at least one of the source database or the target database, generating a copy of at least one data block in the set of one or more data blocks for the particular file.

16. The one or more non-transitory computer-readable media of claim 10, further sotring instructions, which, when executed by the one or more processors, cause the one or more computing devices to perform:
  generating a target filename for each snapshot copy in the target database based, at least in part, on a source filename of a respective source file in the source database.

17. The one or more non-transitory computer-readable media of claim 10, wherein said statement specifying to create the target database as a clone of the source database is a single database command.

18. The one or more non-transitory computer-readable media of claim 17, wherein the database command conforms to a structured query language syntax and includes a clause for specifying that a clone of the source database should be a snapshot copy.

* * * * *